(12) United States Patent
Berna et al.

(10) Patent No.: US 12,492,010 B2
(45) Date of Patent: Dec. 9, 2025

(54) SYNTHETIC FLIGHT PERFORMANCE DATA GENERATION

(71) Applicant: THE BOEING COMPANY, Arlington, VA (US)

(72) Inventors: Antonio Gracia Berna, Madrid (ES); Carlos Querejeta Masaveu, Madrid (ES); Javier Lopez Leones, Majadahonda (ES)

(73) Assignee: THE BOEING COMPANY, Arlington, VA (US)

( * ) Notice: Subject to any disclaimer, the term of this patent is extended or adjusted under 35 U.S.C. 154(b) by 70 days.

(21) Appl. No.: 18/482,229

(22) Filed: Oct. 6, 2023

(65) Prior Publication Data

US 2024/0150034 A1    May 9, 2024

(30) Foreign Application Priority Data

Nov. 3, 2022 (EP) .................................. 22383060

(51) Int. Cl.
*B64D 45/00* (2006.01)

(52) U.S. Cl.
CPC ...... *B64D 45/00* (2013.01); *B64D 2045/0085* (2013.01)

(58) Field of Classification Search
CPC ............ B64D 45/00; B64D 2045/0085; G06N 3/0442; G06N 3/0464; G06N 3/0475; G06N 3/084; G06N 3/094; G06Q 50/40; G06Q 10/04
USPC ........................................................ 701/32.1
See application file for complete search history.

(56) References Cited

U.S. PATENT DOCUMENTS

| | | | |
|---|---|---|---|
| 2020/0134446 A1* | 4/2020 | Soni | G06N 3/047 |
| 2020/0234602 A1* | 7/2020 | Irrgang | G07C 5/0816 |
| 2021/0034975 A1* | 2/2021 | Luo | G06Q 30/0269 |
| 2021/0141986 A1* | 5/2021 | Ganille | G06Q 10/04 |
| 2022/0036282 A1* | 2/2022 | Inamdar | G06F 16/24578 |
| 2022/0309342 A1* | 9/2022 | Borgohain | G06N 3/047 |

OTHER PUBLICATIONS

Cho, Kyunghyun et al., "Learning Phrase Representations using RNN Encoder-Decoder for Statistical Machine Translation," arXiv:1406.1078v3 [cs.CL] Sep. 3, 2014. pp. 1-15.
Extended European Search Report for application No. 22383060.5 dated Apr. 25, 2023, pp. 1-7.
Gulrajani, Ishaan et al., "Improved Training of Wasserstein GANs," arXiv:1704.00028v3 [cs.LG], Dec. 25, 2017, pp. 1-20.

(Continued)

*Primary Examiner* — Muhammad Shafi
(74) *Attorney, Agent, or Firm* — Moore IP Law (57) ABSTRACT

Systems and methods of synthetic flight performance data generation include obtaining training data corresponding to multiple timeseries of multivariate aircraft performance data of actual aircraft flights. The systems and methods also include performing a training operation of a generative adversarial network that includes a synthetic aircraft performance data generator and a discriminator. After completion of the training operation, the systems and methods also include receiving one or more input parameters, and generating, at the synthetic aircraft performance data generator, one or more timeseries of synthetic aircraft performance data based on the one or more input parameters.

20 Claims, 4 Drawing Sheets

(56) References Cited

OTHER PUBLICATIONS

Hyland, Stephanie L. et al. "Real-Valued (Medical) Time Series Generation with Recurrent Conditional GANS," arXiv:1706.02633v2 [stat.ML] Dec. 4, 2017, p. 1-13.

Snow, Derek, "MTSS-GAN: Multivariate Time Series Simulation Generative Adversarial Networks," https://papers.ssrn.com/sol3/papers.cfm?abstract_id=3616557, retrieved Jun. 27, 2022, pp. 1-2.

Yoon, Jinsung et al., "Time-series Generative Adversarial Networks," 33rd Conference on Neural Information Processing Systems (NeurIPS 2019, Vancouver, Canada, pp. 1-11.

\* cited by examiner

```
┌─────────────────────────────────────────────────────────────────┐
│ OBTAINING TRAINING DATA CORRESPONDING TO MULTIPLE TIMESERIES    │
│ OF MULTIVARIATE AIRCRAFT PERFORMANCE DATA OF ACTUAL             │
│ AIRCRAFT FLIGHTS.                                               │
│                              302                                │
└─────────────────────────────────────────────────────────────────┘
                                │
                                ▼
┌─────────────────────────────────────────────────────────────────┐
│ PERFORMING A TRAINING OPERATION OF A GENERATIVE ADVERSARIAL     │
│ NETWORK THAT INCLUDES A SYNTHETIC AIRCRAFT PERFORMANCE          │
│ DATA GENERATOR AND A DISCRIMINATOR, THE TRAINING OPERATION      │
│ INCLUDING:                                                      │
│ UPDATING THE SYNTHETIC AIRCRAFT PERFORMANCE DATA                │
│ GENERATOR TO IMPROVE A LIKELIHOOD THAT SYNTHETIC AIRCRAFT       │
│ PERFORMANCE DATA GENERATED BY THE SYNTHETIC AIRCRAFT            │
│ PERFORMANCE DATA GENERATOR IS IDENTIFIED AS ACTUAL AIRCRAFT     │
│ PERFORMANCE DATA BY THE DISCRIMINATOR; AND                      │
│ UPDATING THE DISCRIMINATOR TO IMPROVE AN ABILITY OF THE         │
│ DISCRIMINATOR TO DISTINGUISH BETWEEN THE TRAINING DATA AND      │
│ THE SYNTHETIC AIRCRAFT PERFORMANCE DATA GENERATED BY THE        │
│ SYNTHETIC AIRCRAFT PERFORMANCE DATA GENERATOR.                  │
│                              304                                │
└─────────────────────────────────────────────────────────────────┘
                                │
                                ▼
┌─────────────────────────────────────────────────────────────────┐
│ AFTER COMPLETION OF THE TRAINING OPERATION, RECEIVING ONE       │
│ OR MORE INPUT PARAMETERS.                                       │
│                              306                                │
└─────────────────────────────────────────────────────────────────┘
                                │
                                ▼
┌─────────────────────────────────────────────────────────────────┐
│ AFTER COMPLETION OF THE TRAINING OPERATION, GENERATING, AT      │
│ THE SYNTHETIC AIRCRAFT PERFORMANCE DATA GENERATOR, ONE          │
│ OR MORE TIMESERIES OF SYNTHETIC AIRCRAFT PERFORMANCE DATA       │
│ BASED ON THE ONE OR MORE INPUT PARAMETERS.                      │
│                              308                                │
└─────────────────────────────────────────────────────────────────┘
```

SYNTHETIC FLIGHT PERFORMANCE DATA GENERATION

CROSS REFERENCE TO RELATED APPLICATIONS

The subject disclosure claims priority to European Patent Application No. 22383060.5, filed Nov. 3, 2022, entitled "Synthetic Flight Performance Data Generation," the entire contents of which are herein incorporated by reference.

FIELD OF THE DISCLOSURE

The subject disclosure is generally related to synthetic flight performance data generation.

BACKGROUND

To improve the efficiency and efficacy of automated data environments for aircraft performance data, the need for greater volumes of statistically diverse flight performance data has correspondingly increased. Current real-world constraints on resources (e.g., time, fuel, space, etc.) limits the number of actual flights that can be undertaken in order to provide increased volumes of flight performance data.

Certain current systems and methods for providing synthetic data are limited by data quality issues, whether in the diversity of the synthetic data generated, the data quality's impact on subsequent applications, or both, leaving a need for an automated environment for generating synthetic flight performance data.

SUMMARY

In a particular implementation, a method includes obtaining training data corresponding to multiple timeseries of multivariate aircraft performance data of actual aircraft flights. The method also includes performing a training operation of a generative adversarial network that includes a synthetic aircraft performance data generator and a discriminator. The training operation includes updating the synthetic aircraft performance data generator to improve a likelihood that synthetic aircraft performance data generated by the synthetic aircraft performance data generator is identified as actual aircraft performance data by the discriminator. The training operation also includes updating the discriminator to improve an ability of the discriminator to distinguish between the training data and the synthetic aircraft performance data generated by the synthetic aircraft performance data generator. The method also includes, after completion of the training operation, receiving one or more input parameters and generating, at the synthetic aircraft performance data generator, one or more timeseries of synthetic aircraft performance data based on the one or more input parameters.

In another particular implementation, a system includes a memory configured to store instructions and one or more processors configured to obtain training data corresponding to multiple timeseries of multivariate aircraft performance data of actual aircraft flights. The one or more processors are also configured to perform a training operation of a generative adversarial network that includes a synthetic aircraft performance data generator and a discriminator. The training operation includes an update of the synthetic aircraft performance data generator to improve a likelihood that synthetic aircraft performance data generated by the synthetic aircraft performance data generator is identified as actual aircraft performance data by the discriminator. The training operation also includes an update of the discriminator to improve an ability of the discriminator to distinguish between the training data and the synthetic aircraft performance data generated by the synthetic aircraft performance data generator. The one or more processors are also configured to, after completion of the training operation, receive one or more input parameters and generate, at the synthetic aircraft performance data generator, one or more timeseries of synthetic aircraft performance data based on the one or more input parameters.

In another particular embodiment, a non-transient, computer-readable medium stores instructions that, when executed by one or more processors, cause the one or more processors to initiate, perform, or control operations including obtaining training data corresponding to multiple timeseries of multivariate aircraft performance data of actual aircraft flights. The operations also include performing a training operation of a generative adversarial network that includes a synthetic aircraft performance data generator and a discriminator. The training operation includes updating the synthetic aircraft performance data generator to improve a likelihood that synthetic aircraft performance data generated by the synthetic aircraft performance data generator is identified as actual aircraft performance data by the discriminator. The training operation also includes updating the discriminator to improve an ability of the discriminator to distinguish between the training data and the synthetic aircraft performance data generated by the synthetic aircraft performance data generator. The operations also include, after completion of the training operation, receiving one or more input parameters and generating, at the synthetic aircraft performance data generator, one or more timeseries of synthetic aircraft performance data based on the one or more input parameters.

In another particular embodiment, a device includes means for obtaining training data corresponding to multiple timeseries of multivariate aircraft performance data of actual aircraft flights. The device also includes means for performing a training operation of a generative adversarial network that includes a synthetic aircraft performance data generator and a discriminator. The training operation includes updating the synthetic aircraft performance data generator to improve a likelihood that synthetic aircraft performance data generated by the synthetic aircraft performance data generator is identified as actual aircraft performance data by the discriminator. The training operation also includes updating the discriminator to improve an ability of the discriminator to distinguish between the training data and the synthetic aircraft performance data generated by the synthetic aircraft performance data generator. The device also includes means for, after completion of the training operation, receiving one or more input parameters and means for generating, at the synthetic aircraft performance data generator, one or more timeseries of synthetic aircraft performance data based on the one or more input parameters.

The features, functions, and advantages described herein can be achieved independently in various implementations or can be combined in yet other implementations, further details of which can be found with reference to the following description and drawings.

DETAILED DESCRIPTION

Aspects disclosed herein describe automated systems and methods that enable generation of completely synthetic aircraft data containing flight condition values (i.e., altitude, temperature, mass, speed, etc.) and their corresponding performance values (i.e., fuel consumption, lift, drag, etc.) over the full course of a flight. The automated systems and methods can include one or more machine learning algorithms trained to learn relevant patterns and relationships hidden in parameters of historical flights by different aircraft models and tail numbers and generate new data that reproduce—in a realistic, diverse manner—the behaviors seen in the original data. The automated systems and methods can take actual aircraft performance data collected inflight by different aircraft models during several years. The automated systems and methods can process, clean, reduce, and filter the actual aircraft performance data, and then use that data as input for a Generative Adversarial Network (GAN) configured to generate, in a statistically diverse way, synthetic flight data from take-off until landing, the synthetic flight data containing realistic patterns of flight condition values and associated performances. The automated systems and methods disclosed herein can generate a relatively large amount of synthetic data emulating realistic flights.

The automated systems and methods disclosed herein enable a framework that allow for the generation of realistic time series of operational performance data without the need of complex simulation tools or agreements with airlines. Users could produce performance data as if it were generated in a real flight. Flight test data acquisition campaigns could be also complemented by the data generated with the systems and methods disclosed herein.

As described in more detail below, aspects of the automated systems and methods include automation of data acquisition and processing, model training, and data generation. Multiple timeseries of multivariate aircraft performance data can be downloaded from different data sources and for specific aircraft models and tail numbers. The data can be cleaned, filtered, reduced, sampled, and relevant parameters selected for the synthetic data generation process. A training process is conducted by a GAN in which two different neural networks, a generator and a discriminator, compete with each other in a manner such that one agent's gain is another agent's loss. A GAN is based on the indirect training through the discriminator, which itself is also being updated dynamically. The generator is train to 'fool' the discriminator, thus enabling the model to learn in an unsupervised manner. In the particular context of the automated systems and methods disclosed herein, the generator can be configured to produce a synthetic flight, while the discriminator can be configured to analyze the synthetic flight and determine whether the discriminator believes the synthetic flight is real or synthetic at least by comparing it to real flights (e.g., properties or characteristics discerned from real flight data) that the discriminator has previously learned. When the generator, over time, learns how to produce a synthetic flight that is so realistic that the discriminator is not able to classify it as synthetic, an optimal training point can be established, and the generator can be configured to generate new data with statistics similar to the training set.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a system 100 including one or more processors ("processor(s)" 118 in FIG. 1), which indicates that in some implementations the system 100 includes a single processor 118 and in other implementations the system 100 includes multiple processors 118.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Figure 1:
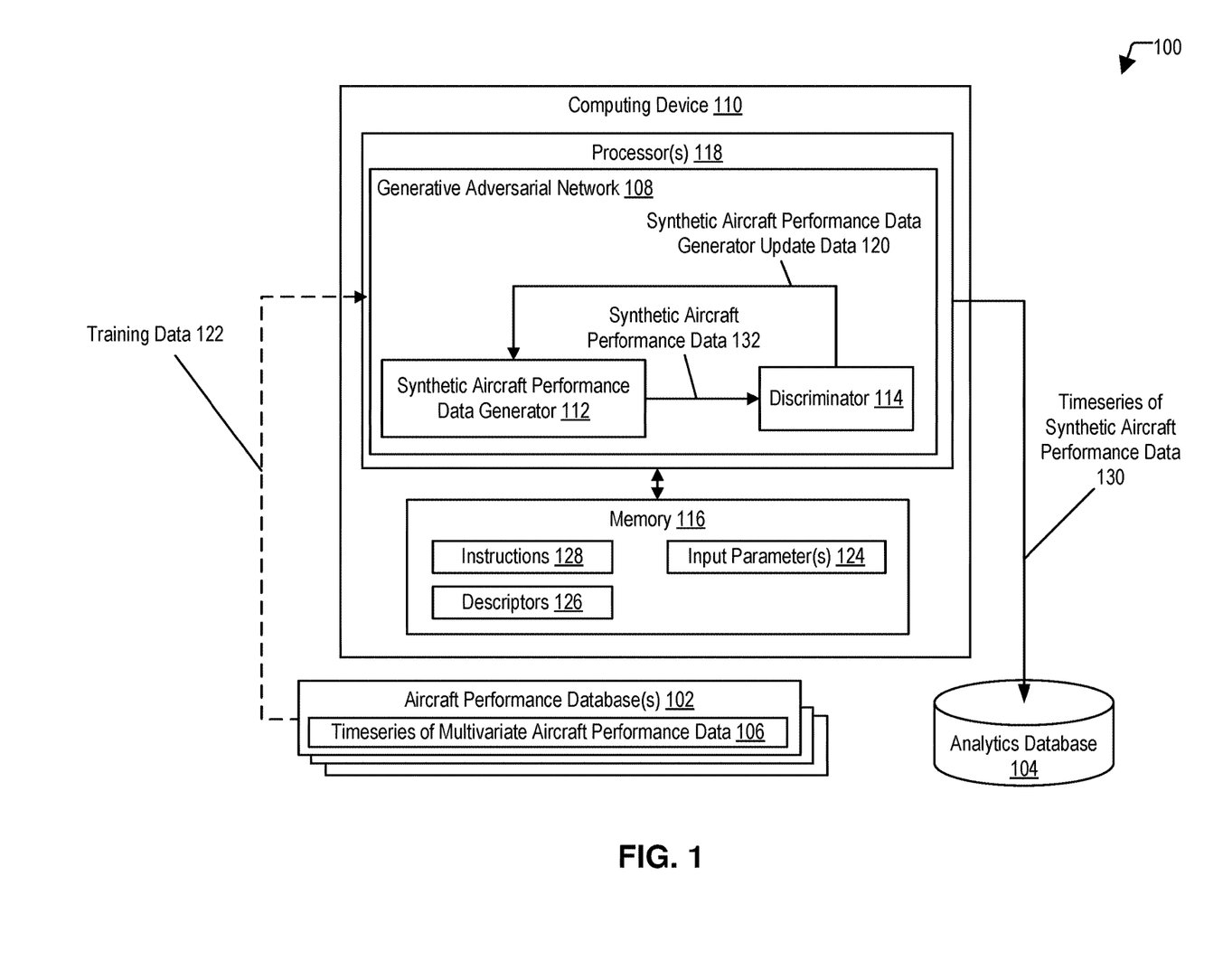
FIG. 1 depicts an example system for synthetic flight performance data generation, in accordance with at least one implementation of the subject disclosure.

FIG. 1 depicts an example system 100 for synthetic flight performance data generation, in accordance with at least one implementation of the subject disclosure. In some implementations, the system 100 includes a computing device 110 including one or more processors 118 coupled to a memory 116 storing instructions 128. As described in more detail below, the processor(s) 118 can include a generative adversarial network 108 including at least a synthetic aircraft performance data generator 112 coupled to a discriminator 114. In some implementations, the computing device 110 can be configured to communicate with one or more aircraft performance databases 102 and an analytics database 104.

In some implementations, the aircraft performance database(s) 102 can each be configured to store one or more timeseries of multivariate aircraft performance data 106. In some aspects, the one or more timeseries of multivariate aircraft performance data 106 can include Quick Access Recorded (QAR) flight data collected from a plurality of flight data associated with real-world flights from different aircraft. For example, the one or more timeseries of multivariate aircraft performance data 106 can include QAR flight data collected from thousands of real flights of a plurality of Boeing 737-800W aircraft with different tail numbers.

In some implementations, the computing device 110 can be configured to receive training data 122 from the aircraft performance database(s) 102. In some aspects, the training data 122 can be associated with one or more of the timeseries of multivariate aircraft performance data 106 from one or more of the aircraft performance databases 102. For example, the training data 122 can include data representative of the one or more timeseries of multivariate aircraft performance data 106 in which each timeseries of the one or more timeseries of multivariate aircraft performance data 106 has been sampled up to a particular number of time steps, such as 200 time steps. In some implementations, the computing device 110 can be configured to use the training data 122 as training data for the generative adversarial network 108. As described in more detail below, in some aspects, the data received from the aircraft performance database(s) 102 can be processed by the processor(s) 118 prior to its use as the training data 122.

In some implementations, the processor(s) 118 can be configured to perform a training operation of the generative adversarial network 108 that includes the synthetic aircraft performance data generator 112 and the discriminator 114. The training operation can include updating the synthetic aircraft performance data generator 112 to improve a likelihood that synthetic aircraft performance data 132 generated by the synthetic aircraft performance data generator 112 is identified as actual aircraft performance data by the discriminator 114. The training operation can also include updating the discriminator 114 to improve an ability of the discriminator 114 to distinguish between the training data 122 and the synthetic aircraft performance data 132 generated by the synthetic aircraft performance data generator 112.

In some aspects, the GAN 108 implementing the training operation can include two neural networks (e.g., the synthetic aircraft performance data generator 112 and the discriminator 114) that interact in an antagonistic way to reach a goal. For example, the GAN 108 can be implemented as a Wasserstein GAN with gradient penalty. In such an example, the synthetic aircraft performance data generator 112 can be a Gated Recurrent Unit (GRU) type of neural network responsible for producing the synthetic aircraft performance data 132 as timeseries data from random noise as input data. In a particular example, the synthetic aircraft performance data generator 112 can be seeded with randomized or pseudo-randomized input sampled from a predefined latent space (e.g., a multivariate normal distribution). In a particular aspect, the synthetic aircraft performance data generator 112 can include a first layer of recurrent cells; a second layer of recurrent cells, where the second layer is smaller than the first layer; and a third layer of densely-connected cells.

The synthetic aircraft performance data generator 112 can be configured to perform a series of data transformations on the input data matrix until generating the synthetic aircraft performance data 132 with the same dimensions as the training data 122. At a first point in the training operation, the synthetic aircraft performance data 132 can be relatively close to random or pseudo-random data. At a second point in the training operation, after multiple iterations, the synthetic aircraft performance data generator 112 can be configured to learn to produce increasingly realistic (e.g., demonstrating patterns and trends similar to those found in the training data 122) timeseries data as the synthetic aircraft performance data 132. For example, the synthetic aircraft performance data generator 112 can be configured to focus on the timeseries data associated with fuel flow consumption throughout the duration of a flight. In doing so, the synthetic aircraft performance data generator 112 can produce synthetic aircraft performance data 132 that can have substantially the same temporal evolutions found in the training data 122 as well as other temporal relationships with respect to other parameters such as speed or total air temperature.

Further, the synthetic aircraft performance data generator 112 can be configured such that every time the synthetic aircraft performance data generator 112 generates the synthetic aircraft performance data 132, the statistical diversity of the synthetic aircraft performance data 132 is high enough for the synthetic aircraft performance data 132 not to seem a clone to other time series, thus adding another dimension of realism to the synthetic aircraft performance data 132. Such a configuration of the synthetic aircraft performance data generator 112 can allow the synthetic aircraft performance data generator 112 to be configured to discriminate between minibatches of samples of the training data 122 rather than between individual samples. Such a configuration can avoid a 'collapse' of the synthetic aircraft performance data generator 112 that results in generating clone synthetic time series rather than statistically diverse synthetic aircraft performance data 132.

In some aspects, the discriminator 114 can be implemented as a GRU neural network connected to a fully convolutional layer that learns and specializes in distinguishing the synthetic aircraft performance data 132 produced by the synthetic aircraft performance data generator 112 from the training data 122. In a particular aspect, the discriminator 114 can include a first convolution layer, a second convolution layer, a one-dimensional max-pooling layer, a layer of recurrent cells, and at least one layer of densely-connected cells.

In some implementations, the discriminator 114 can receive as input two different data sources: the training data 122 and the synthetic aircraft performance data 132. The discriminator 114 can be configured to learn to detect differences between the training data 122 and the synthetic aircraft performance data 132 in order to classify the synthetic aircraft performance data 132 as 'real' or 'fake'. At a first point in the training operation, the discriminator 114 can have difficult differentiating between the synthetic aircraft performance data 132 and the training data 122. As the training operation continues, at a second, later time in the training operation, the discriminator 114 will learn to differentiate the synthetic aircraft performance data 132 form the training data 122 more accurately. As an illustrative example, the discriminator 114 can be trained in a training operation where the training data 122 includes approximately 10,000 real multivariate time series of QAR data belonging to different tail numbers of a Boeing 737-800W aircraft.

As an illustrative example, at a relatively early stage of the training operation (e.g., tenth iteration), the GAN 108 is not yet able to capture and reproduce the patterns contained in the real data, so the synthetic aircraft performance data 132 is relatively poor when compared to the training data 122. As the training operation continues, the synthetic aircraft performance data 132 improves when compared to the training data 122. For example, at iterations 1,100 and 2,900, the GAN 108 can demonstrate an increased correlation in the patterns and relationships found in the synthetic aircraft performance data 132 and the training data 122. At iteration 6,700, the GAN 108 can generate synthetic aircraft performance data 132 that the discriminator 114 cannot distinguish from the actual flight data (e.g., the training data 122, other testing data that is based on actual flight data, or a combination thereof). In a particular example, the GAN 108 can generate all the QAR parameters for a particular time step of a particular synthetic time series at once (e.g., the synthetic time series generated by the GAN 108 are multivariate, not univariate time series), capturing trends, patterns and key relationships between the aircraft performance parameters over the different stages of a flight.

In some implementations, the training operations can include the discriminator 114 configured to provide an update to one or more portions of the generative adversarial network 108. For example, the discriminator 114 can provide synthetic aircraft performance data generator update data 120 to the synthetic aircraft performance data generator 112. In an illustrative, non-limiting example, the synthetic aircraft performance data generator update data 120 can indicate whether one or more synthetic time series generated by the synthetic aircraft performance data generator 112 was classified by the discriminator 114 as actual or synthetic. Such feedback enables the synthetic aircraft performance data generator 112 to be updated to generate more realistic synthetic aircraft performance data 132.

In some implementations, the generative adversarial network 108 can be trained using one or more descriptors 126 associated with one or more aspects of the training data 122. For example, the descriptors 126 can include data associated with a cruising altitude, initial weight, one or more weather conditions, an airspace, or a combination thereof for one or more particular flights. Other descriptors 126 can be present in the system 100 without departing from the scope of the subject disclosure.

In some implementations, the training operation can be deemed to have completed when a predetermined and/or dynamic threshold has been met. For example, the training operation can be complete when the discriminator 114 can no longer distinguish between the synthetic aircraft performance data 132 and the training data 122 (e.g., as indicated by the synthetic aircraft performance data generator update data 120).

After completion of the training operation, the processor(s) 118 can be configured to receive one or more input parameters 124 associated with a quantity and/or quality of timeseries of synthetic aircraft performance data 130 to be generated by the computing device 110. In some aspects, the input parameter(s) 124 can indicate how many of the timeseries of synthetic aircraft performance data 130 are to be generated. In the same or alternative aspects, the input parameter(s) 124 can include a number of flights, a particular cruising altitude, a particular initial weight, one or more particular weather conditions, a particular airspace, or a combination thereof. Such aspects may be particularly implemented in configurations in which the descriptors 126 include data associated with a cruising altitude, initial weight, one or more weather conditions, an airspace, or a combination thereof for one or more particular flights. Other input parameter(s) 124 can be present in the system 100 without departing from the scope of the subject disclosure.

After completion of the training operation, the processor(s) 118 can also be configured to generate, at the synthetic aircraft performance data generator 112, one or more timeseries of synthetic aircraft performance data 130 based at least on the one or more input parameters 124. For example, the processor(s) 118 can be configured to generate 1,000 timeseries of synthetic aircraft performance data 130 associated with a synthetic flight of a particular cruising altitude (e.g., 15,000 feet), initial weight (e.g., 100,000 pounds), and weather condition (e.g., clear). In some aspects, the timeseries of synthetic aircraft performance data 130 can include timeseries data emulating multiple flight parameters over each of one or more flights. In a particular aspect, the flight parameters can include altitude, Mach number, total air temperature, ground speed, gross weight, fuel consumption, or some combination thereof. For example, the timeseries of synthetic aircraft performance data 130 can include timeseries data emulating 1,000 different flights, where each emulated flight is associated with a different combination of a plurality of flight parameters, including cruising altitude (e.g., steps in a range of 15,000-18,000 feet), initial weight (e.g., steps in a range of 100,000-150,000 pounds), and weather conditions (e.g., clear, partly cloudy, etc.). Other flight parameters can be present within the system 100 without departing from the scope of the subject disclosure.

In some implementations, the processor(s) 118 can be configured to store the one or more timeseries of synthetic aircraft performance data 130 at the analytics database 104 (e.g., one or more databases configured to store aircraft performance data for analysis). In some aspects, the analytics database 104 can be configured for use in determining data analytics, aircraft performance analyses, or a combination thereof. For example, the computing device 110 (and/or another computing device coupled to the analytics database 104) can be configured to use the data stored in the analytics database 104 to create robust error metrics for assessing and validating the quality, diversity, and coherence of the timeseries of synthetic aircraft performance data 130.

Although FIG. 1 illustrates certain operations occurring within the computing device 110, the aircraft performance database(s) 102, and/or the analytics database 104, certain operations can be performed by other components of the system 100 without departing from the scope of the subject disclosure. For example, aircraft performance database(s) 102 can be configured to store the timeseries of synthetic aircraft performance data 130. As an additional example, the aircraft performance database(S) 102 can be configured to perform some or all of the preprocessing described above (and in more detail below) to generate the training data 122.

Further, although FIG. 1 illustrates the computing device 110, the aircraft performance database(s) 102, and/or the analytics database 104 as separate, other configurations are possible without departing from the scope of the subject disclosure. For example, the computing device 110 and the analytics database 104 can be integrated into a single electronic device. As an additional example, some or all components of the computing device 110 can be integrated into the same electronic device as some or all components of the aircraft performance database(s) 102. As a further example, one or more components of the computing device 110 and/or one or more components of the analytics database 104 can be distributed across a plurality of computing devices (e.g., a group of servers).

Figure 2:
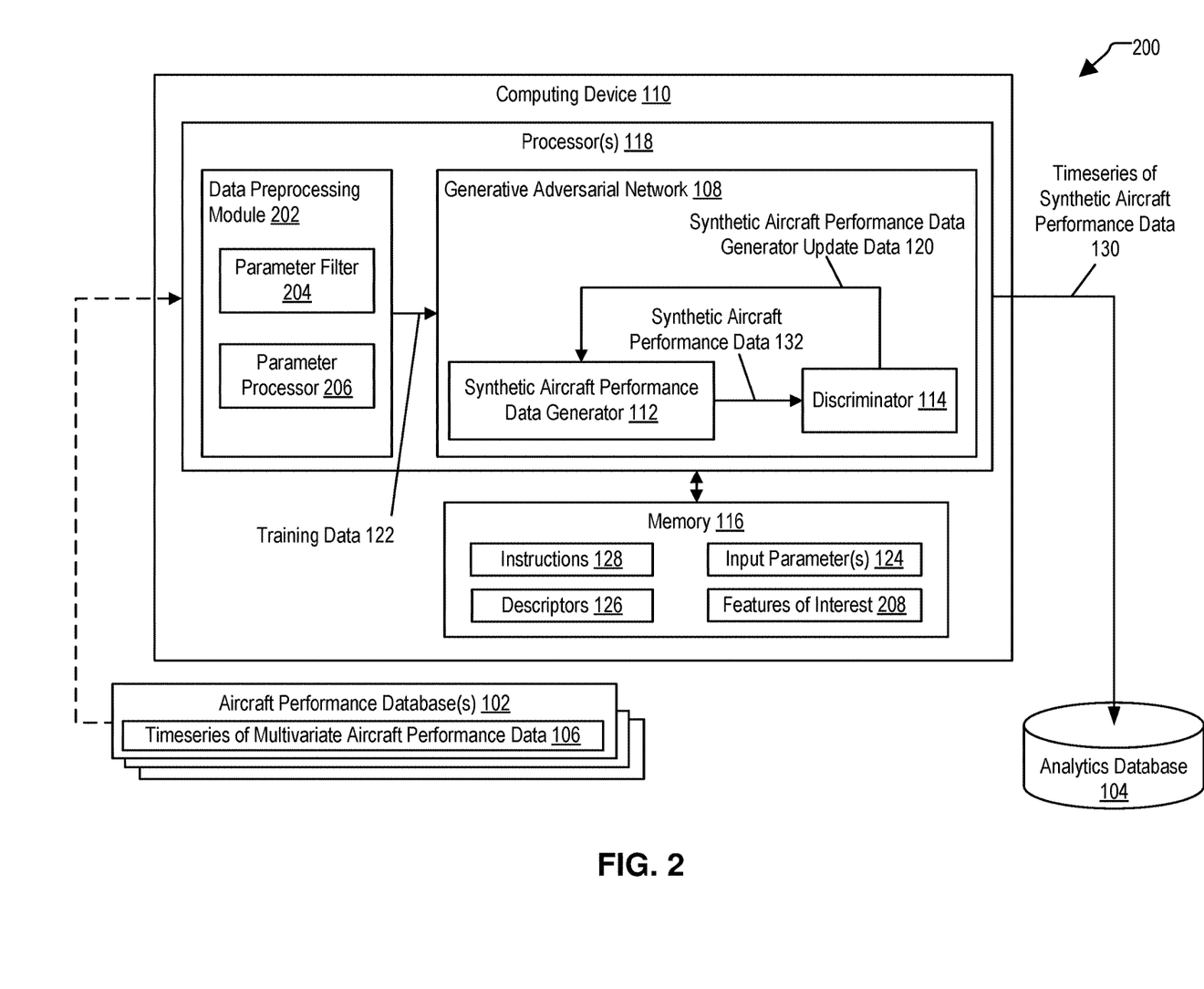
FIG. 2 depicts another example system for synthetic flight performance data generation, in accordance with at least one implementation of the subject disclosure.

FIG. 2 depicts another example system 200 for synthetic flight performance data generation, in accordance with at least one implementation of the subject disclosure. Generally, the components of the system 200 sharing a reference number with similar objects of the system 100 of FIG. 1 correspond to those objects. For example, the computing device 110 of FIG. 2 generally corresponds to the computing device 110 of FIG. 1 described in more detail above.

In some implementations, the system 200 includes a data preprocessing module 202 that includes a parameter filter 204 and a parameter processor 206. In some implementations, the data preprocessing module 202, the parameter filter 204, and/or the parameter processor 206 can be part of one or more of the processor(s) 118 of FIG. 1. In some aspects, the data preprocessing module 202 can be configured to receive the multiple timeseries of multivariate aircraft performance data 106 from the one or more aircraft performance databases 102. As described in more detail above with reference to FIG. 1, in some aspects, the timeseries of multivariate aircraft performance data 106 can be processed by the processor(s) 118 prior to providing the training data 122 to the generative adversarial network 108. In a particular aspect, the data preprocessing module 202 can be configured to provide some or all of that processing.

For example, the data preprocessing module 202 can be configured to receive multiple timeseries of QAR data, where each timeseries of QAR data corresponds to one of the actual flights represented by the multiple timeseries of multivariate aircraft performance data 106. The parameter filter 204 can be configured to filter parameters of the multiple timeseries of QAR data based on one or more features of interest 208. The features of interest 208 can include features such as altitude, Mach number, total air temperature, ground speed, gross weight, fuel consumption, or some combination thereof. Other features of interest 208 can be present in the system 200 without departing from the scope of the subject disclosure. To illustrate, the parameter filter 204 can be configured to filter the multiple timeseries of QAR data to identify QAR data corresponding to a particular total air temperature, ground speed, gross weight, fuel consumption, or some combination thereof.

In the same or alternative example, the parameter processor 206 can be configured to process the filtered parameters to remove outlier values, add missing values, or both to generate multiple timeseries of processed input data (e.g., the training data 122). To illustrate, the parameter processor 206 can be configured to perform a smoothing operation on the data from the parameter filter 204. As an additional illustration, the parameter processor 206 can be configured to perform a normalization operation on the data from the parameter filter 204.

In addition to the operations performed by the parameter filter 204 and/or the parameter processor 206, the data preprocessing module 202 can be configured to perform other operations appropriate to generation of the training data 122. For example, the data preprocessing module 202 can be configured to resample each of the multiple timeseries of processed input data (e.g., the data from the parameter processor 206) to have a uniform amount of time steps.

Although FIG. 2 illustrates certain operations occurring within various components of the system 200, certain operations can be performed by other components of the system 200 without departing from the scope of the subject disclosure. For example, the operations performed by the parameter filter 204 and/or the parameter processor 206 can be performed by one or more other components of the computing device 110. As another example, certain operations can be performed by the parameter filter 204 and/or the parameter processor 206 can be performed by one or more of the aircraft performance databases 102.

Further, although FIG. 2 illustrates the various components of the system 200 as separate, other configurations are possible without departing from the scope of the subject disclosure. For example, the parameter filter 204 can be combined with the parameter processor 206. As another example, one or more of the parameter filter 204 and/or the parameter processor 206 can be located at one or more of the aircraft performance databases 102.

Figure 3:
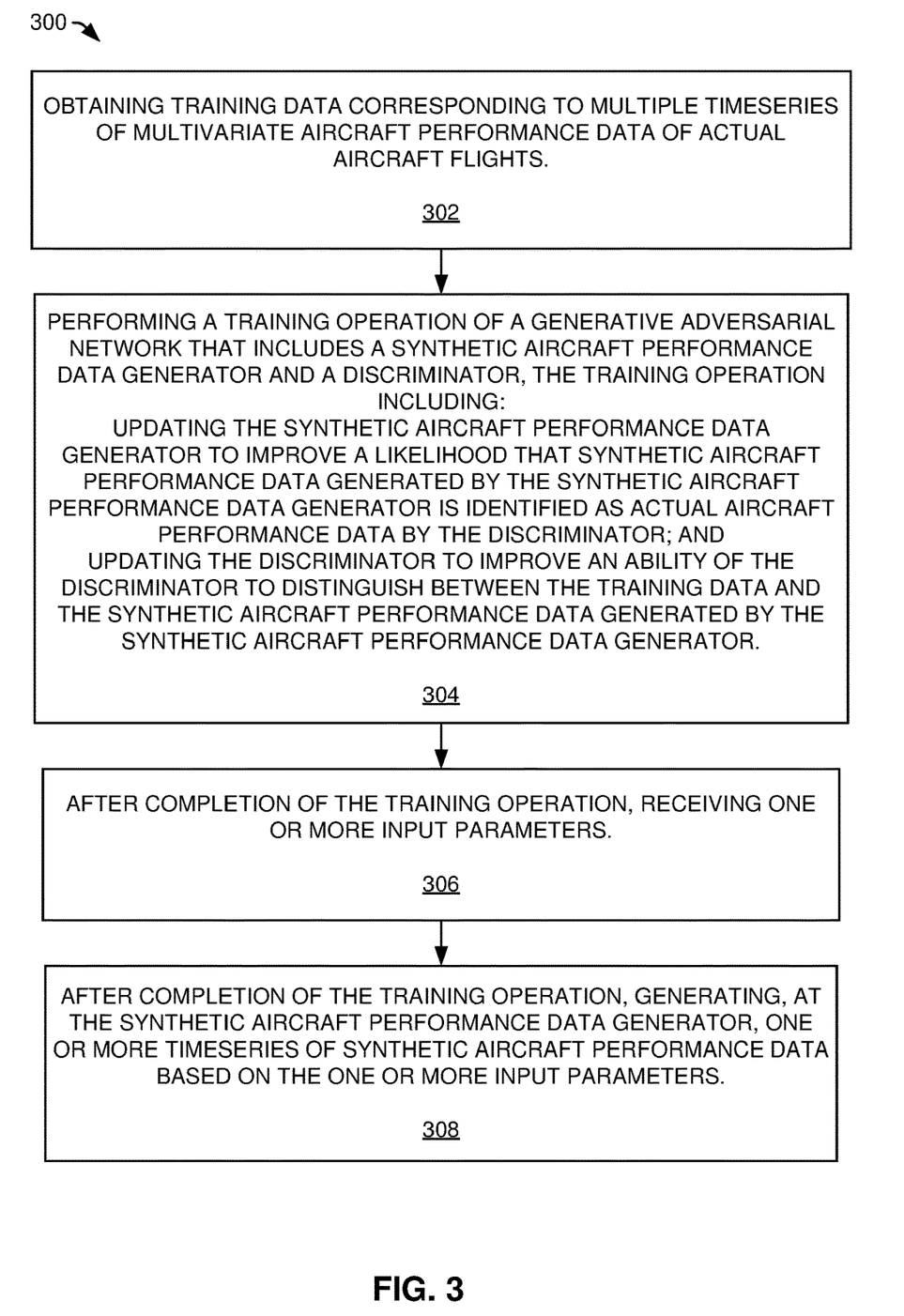
FIG. 3 is a flow chart of an example of a method for synthetic flight performance data generation, in accordance with at least one implementation of the subject disclosure.

FIG. 3 is a flow chart of an example of a method 300 for synthetic flight performance data generation, in accordance with at least one implementation of the subject disclosure. The method 300 can be initiated, performed, or controlled by one or more processors executing instructions, such as by the processor(s) 118 of FIG. 1 executing instructions from the memory 116.

In some implementations, the method 300 includes, at block 302, obtaining training data corresponding to multiple timeseries of multivariate aircraft performance data of actual aircraft flights. For example, the processor(s) 118 of FIG. 1 can obtain the training data 122 corresponding to multiple timeseries of multivariate aircraft performance data 106 of actual aircraft flights.

In some implementations, the method 300 also includes, at block 304, performing a training operation of a generative adversarial network that includes a synthetic aircraft performance data generator and a discriminator. The training operation can include updating the synthetic aircraft performance data generator to improve a likelihood that synthetic aircraft performance data generated by the synthetic aircraft performance data generator is identified as actual aircraft performance data by the discriminator. The training operation can also include updating the discriminator to improve an ability of the discriminator to distinguish between the training data and the synthetic aircraft performance data generated by the synthetic aircraft performance data generator. For example, the processor(s) 118 of FIG. 1 can perform a training operation of the generative adversarial network 108 that includes the synthetic aircraft performance data generator 112 and the discriminator 114. The training operation can include updating the synthetic aircraft performance data generator 112 (e.g., based on the synthetic aircraft performance data generator update data 120) to improve a likelihood that synthetic aircraft performance data 132 generated by the synthetic aircraft performance data generator 112 is identified as actual aircraft performance data by the discriminator 114.

In some implementations, the method 300 also includes, at block 306, receiving one or more input parameters after completion of the training operation. For example, the processor(s) 118 of FIG. 1 can, after completion of the training operation, receive one or more of the input parameters 124.

In some implementations, the method 300 also includes, at block 308, generating, at the synthetic aircraft performance data generator, one or more timeseries of synthetic aircraft performance data based on the one or more input parameters after completion of the training operation. For example, the processor(s) 118 of FIG. 1 can, after completion of the training operation, generate, at the synthetic aircraft performance data generator 112, one or more timeseries of synthetic aircraft performance data 130 based on the one or more input parameters 124.

Although the method 300 is illustrated as including a certain number of steps, more, fewer, and/or different steps can be included in the method 300 without departing from the scope of the subject disclosure. For example, the method 300 can vary depending on the count and variety of the timeseries of multivariate aircraft performance data 106 available for processing, as described in more detail above with reference to FIGS. 1-2. For example, the method 300 can begin a training operation on a subset of the timeseries of multivariate aircraft performance data 106 while continuing to receive additional data.

Figure 4:
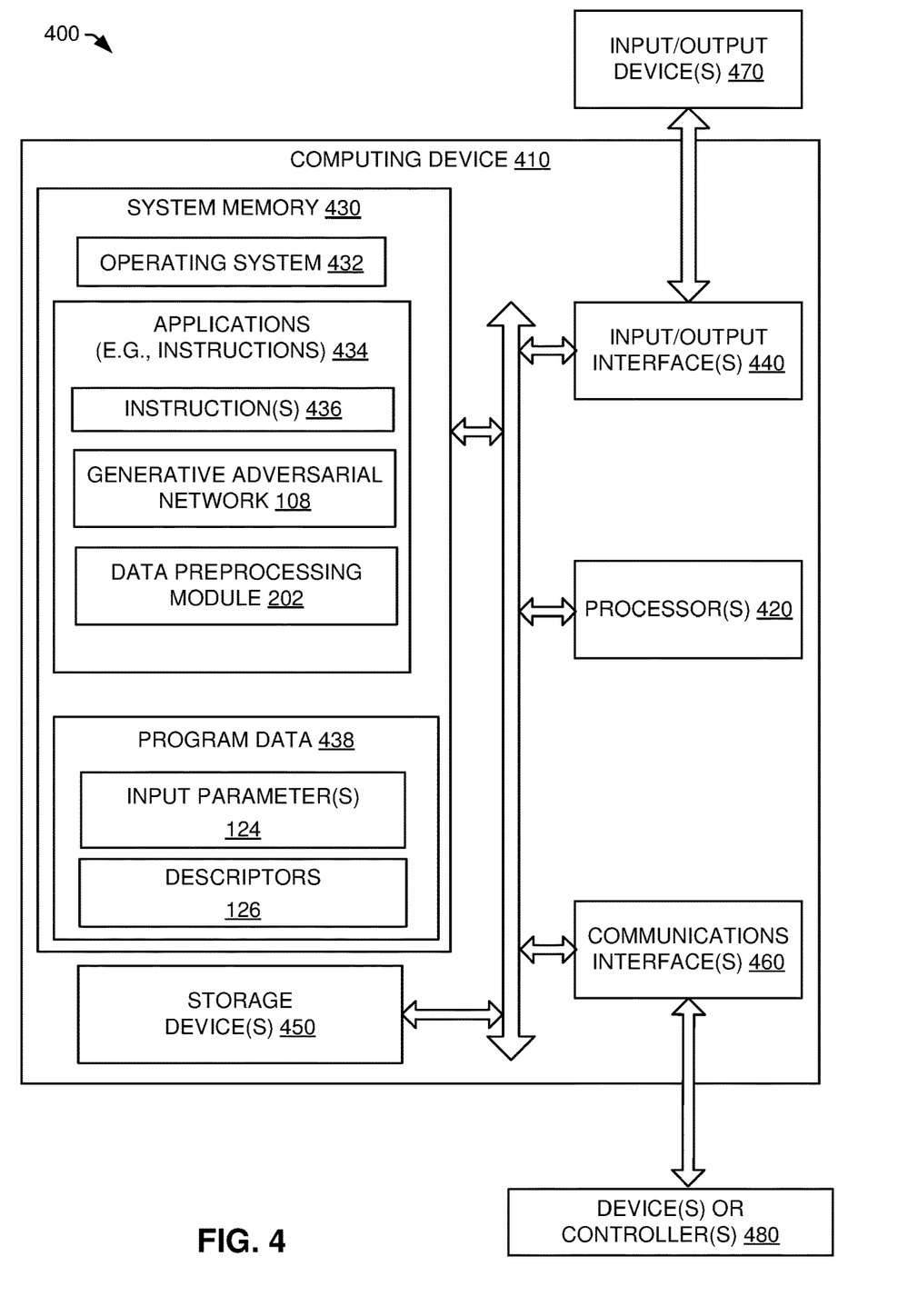
FIG. 4 is a block diagram of a computing environment including a computing device configured to support aspects of computer-implemented methods and computer-executable program instructions (or code), in accordance with at least one implementation of the subject disclosure.

FIG. 4 is a block diagram of a computing environment 400 including a computing device 410 configured to support aspects of computer-implemented methods and computer-executable program instructions (or code), in accordance with at least one implementation of the subject disclosure. For example, the computing device 410, or portions thereof, is configured to execute instructions to initiate, perform, or control one or more operations described in more detail above with reference to FIGS. 1-3. In a particular aspect, the computing device 410 can include the computing device 110, one or more of the aircraft performance databases 102, and/or the analytics database 104; one or more servers; one or more virtual devices; or a combination thereof.

The computing device 410 includes one or more processors 420. In a particular aspect, the processor(s) 420 correspond to the processor(s) 118 of FIG. 1. The processor(s) 420 are configured to communicate with system memory 430, one or more storage devices 450, one or more input/output interfaces 440, one or more communications interfaces 460, or any combination thereof. The system memory 430 includes volatile memory devices (e.g., random access memory (RAM) devices), nonvolatile memory devices (e.g., read-only memory (ROM) devices, programmable read-only memory, and flash memory), or both. The system memory 430 stores an operating system 432, which can include a basic input/output system for booting the computing device 410 as well as a full operating system to enable the computing device 410 to interact with users, other programs, and other devices. The system memory 430 stores system (program) data 438, such as the input parameters 124 of FIG. 1, the descriptors 126 of FIG. 1, or a combination thereof.

The system memory 430 includes one or more applications 434 (e.g., sets of instructions) executable by the processor(s) 420, such as instructions 436, the generative adversarial network 108 of FIG. 1, and the data preprocessing module 202 of FIG. 1. As an example, the one or more applications 434 include the instructions 436 executable by the processor(s) 420 to initiate, control, or perform one or more operations described with reference to FIGS. 1-3. Generally, the instructions 436 correspond to the instructions 128 of FIGS. 1-2 above. To illustrate, the one or more applications 434 include the instructions 436 executable by the processor(s) 420 to initiate, control, or perform one or more operations described with reference to generating, at the synthetic aircraft performance data generator 112 of FIG. 1, one or more timeseries of synthetic aircraft performance data 130 based on the one or more input parameters 124 after completion of the training operation.

In a particular implementation, the system memory 430 includes a non-transitory, computer readable medium (e.g., a computer-readable storage device) storing the instructions 436 that, when executed by the processor(s) 420, cause the processor(s) 420 to initiate, perform, or control operations for synthetic flight performance data generation. The operations include obtaining training data corresponding to multiple timeseries of multivariate aircraft performance data of actual aircraft flights. The operations also include performing a training operation of a generative adversarial network that includes a synthetic aircraft performance data generator and a discriminator. The training operation includes updating the synthetic aircraft performance data generator to improve a likelihood that synthetic aircraft performance data generated by the synthetic aircraft performance data generator is identified as actual aircraft performance data by the discriminator. The training operation also includes updating the discriminator to improve an ability of the discriminator to distinguish between the training data and the synthetic aircraft performance data generated by the synthetic aircraft performance data generator. After completion of the training operation, the operations also include receiving one or more input parameters, and generating, at the synthetic aircraft performance data generator, one or more timeseries of synthetic aircraft performance data based on the one or more input parameters.

The one or more storage devices 450 include nonvolatile storage devices, such as magnetic disks, optical disks, or flash memory devices. In a particular example, the storage devices 450 include both removable and non-removable memory devices. The storage devices 450 are configured to store an operating system, images of operating systems, applications (e.g., one or more of the applications 434), and program data (e.g., the program data 438). In a particular aspect, the system memory 430, the storage devices 450, or both, include tangible computer-readable media. In a particular aspect, one or more of the storage devices 450 are external to the computing device 410. In a particular aspect, the storage device(s) 450 can include some or all of the components of one or more of the aircraft performance databases 102 of FIG. 1, the analytics database 104, or some combination thereof.

The one or more input/output interfaces 440 enable the computing device 410 to communicate with one or more input/output devices 470 to facilitate user interaction. For example, the one or more input/output interfaces 440 can include a display interface, an input interface, or both. For example, the input/output interface 440 is adapted to receive input from a user, to receive input from another computing device, or a combination thereof. In some implementations, the input/output interface 440 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device(s) 470 include one or more user interface devices and displays, including some combination of buttons, keyboards, pointing devices, displays, speakers, microphones, touch screens, and other devices.

The processor(s) 420 are configured to communicate with devices or controllers 480 via the one or more communications interfaces 460. For example, the one or more communications interfaces 460 can include a network interface. The devices or controllers 480 can include, for example, one or more of the aircraft performance databases 102 of FIG. 1, the analytics database 104, or some combination thereof.

In some implementations, a non-transitory, computer readable medium (e.g., a computer-readable storage device) stores instructions that, when executed by one or more processors, cause the one or more processors to initiate, perform, or control operations to perform part of or all the functionality described above. For example, the instructions can be executable to implement one or more of the operations or methods of FIGS. 1-3. In some implementations, part or all of one or more of the operations or methods of FIGS. 1-3 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following clauses:

According to Clause 1, a method includes obtaining training data corresponding to multiple timeseries of multivariate aircraft performance data of actual aircraft flights. The method also includes performing a training operation of a generative adversarial network that includes a synthetic aircraft performance data generator and a discriminator. The training operation includes updating the synthetic aircraft performance data generator to improve a likelihood that synthetic aircraft performance data generated by the synthetic aircraft performance data generator is identified as actual aircraft performance data by the discriminator. The training operation also includes updating the discriminator to improve an ability of the discriminator to distinguish between the training data and the synthetic aircraft performance data generated by the synthetic aircraft performance data generator. After completion of the training operation, the method also includes receiving one or more input parameters, and generating, at the synthetic aircraft performance data generator, one or more timeseries of synthetic aircraft performance data based on the one or more input parameters.

Clause 2 includes the method of Clause 1, wherein the one or more timeseries of synthetic aircraft performance data includes timeseries data emulating multiple flight parameters over each of one or more flights.

Clause 3 includes the method of Clause 2, wherein the flight parameters include altitude, Mach number, total air temperature, ground speed, gross weight, fuel consumption, or a combination thereof.

Clause 4 includes the method of any of Clauses 1-3, wherein the one or more input parameters indicate how many of the timeseries of synthetic aircraft performance data are to be generated.

Clause 5 includes the method of any of Clauses 1-4, wherein the generative adversarial network corresponds to a generative adversarial network that is trained using one or more descriptors corresponding to: cruising altitude, initial weight, one or more weather conditions, an airspace, or a combination thereof.

Clause 6 includes the method of Clause 5, wherein the one or more input parameters include: a number of flights, a particular cruising altitude, a particular initial weight, one or more particular weather conditions, a particular airspace, or a combination thereof.

Clause 7 includes the method of any of Clauses 1-6, wherein obtaining the training data includes: receiving multiple timeseries of quick access recorded (QAR) data, each timeseries of the QAR data corresponding to one of the actual aircraft flights; filtering parameters of the multiple timeseries based on one or more features of interest; and processing the filtered parameters to remove outlier values, add missing values, or both, to generate multiple timeseries of processed input data.

Clause 8 includes the method of Clause 7, wherein processing the filtered parameters further includes performing a smoothing operation and a normalization operation.

Clause 9 includes the method of Clause 7 or 8, wherein the method further includes resampling each of the multiple timeseries of processed input data to have a uniform amount of time steps.

Clause 10 includes the method of any of Clauses 1-9, wherein the synthetic aircraft performance data generator includes a first layer of recurrent cells; a second layer of recurrent cells, the second layer smaller than the first layer; and a third layer of densely-connected cells. The discriminator includes a first convolution layer; a second convolution layer; a 1-dimension maxpooling layer; a layer of recurrent cells; and at least one layer of densely-connected cells.

Clause 11 includes the method of any of Clauses 1-10, wherein the method further includes storing the one or more timeseries of synthetic aircraft performance data for use in determining data analytics, aircraft performance analyses, or a combination thereof.

According to Clause 12, a system includes a memory configured to store instructions, and one or more processors configured to obtain training data corresponding to multiple timeseries of multivariate aircraft performance data of actual aircraft flights. The one or more processors are also configured to perform a training operation of a generative adversarial network that includes a synthetic aircraft performance data generator and a discriminator. The training operation includes an update of the synthetic aircraft performance data generator to improve a likelihood that synthetic aircraft performance data generated by the synthetic aircraft performance data generator is identified as actual aircraft performance data by the discriminator. The training operation also includes an update of the discriminator to improve an ability of the discriminator to distinguish between the training data and the synthetic aircraft performance data generated by the synthetic aircraft performance data generator. After completion of the training operation, the one or more processors are configured to receive one or more input parameters, and generate, at the synthetic aircraft performance data generator, one or more timeseries of synthetic aircraft performance data based on the one or more input parameters.

Clause 13 includes the system of Clause 12, wherein the one or more timeseries of synthetic aircraft performance data includes timeseries data emulating multiple flight parameters over each of one or more flights.

Clause 14 includes the system of Clause 13, wherein the flight parameters include altitude, Mach number, total air temperature, ground speed, gross weight, fuel consumption, or a combination thereof.

Clause 15 includes the system of any of Clauses 12-14, wherein the one or more input parameters indicate how many of the timeseries of synthetic aircraft performance data are to be generated.

Clause 16 includes the system of any of Clauses 12-15, wherein the generative adversarial network corresponds to a generative adversarial network that is trained using one or more descriptors corresponding to: cruising altitude, initial weight, one or more weather conditions, airspace identifier, or a combination thereof, and wherein the one or more input parameters include: a number of flights, a particular cruising altitude, a particular initial weight, one or more particular weather conditions, a particular airspace identifier, or a combination thereof.

Clause 17 includes the system of any of Clauses 12-16, wherein the one or more processors are further configured to receive multiple timeseries of quick access recorded (QAR) data, each timeseries of the QAR data corresponding to one of the actual aircraft flights. The one or more processors are further configured to filter parameters of the multiple timeseries based on one or more features of interest. The one or more processors are further configured to process the filtered parameters to remove outlier values, add missing values, or both, to generate multiple timeseries of processed input data. The one or more processors are further configured to resample each of the multiple timeseries of processed input data to have a uniform amount of time steps to generate multiple resampled timeseries of processed input data, wherein the multiple resampled timeseries of processed input data correspond to the training data.

Clause 18 includes the system of any of Clauses 12-17, wherein the synthetic aircraft performance data generator includes a first layer of recurrent cells; a second layer of recurrent cells, the second layer smaller than the first layer; and a third layer of densely-connected cells. The discriminator includes a first convolution layer; a second convolution layer; a 1-dimension maxpooling layer; a layer of recurrent cells; and at least one layer of densely-connected cells.

According to Clause 19, a non-transient, computer-readable medium storing instructions executable by one or more processors to perform operations that include obtaining training data corresponding to multiple timeseries of multivariate aircraft performance data of actual aircraft flights. The operations also include performing a training operation of a generative adversarial network that includes a synthetic aircraft performance data generator and a discriminator. The training operation includes updating the synthetic aircraft performance data generator to improve a likelihood that synthetic aircraft performance data generated by the synthetic aircraft performance data generator is identified as actual aircraft performance data by the discriminator. The training operation also includes updating the discriminator to improve an ability of the discriminator to distinguish between the training data and the synthetic aircraft performance data generated by the synthetic aircraft performance data generator. After completion of the training operation, the operations also include receiving one or more input parameters; and generating, at the synthetic aircraft performance data generator, one or more timeseries of synthetic aircraft performance data based on the one or more input parameters.

Clause 20 includes the non-transient, computer-readable medium of Clause 19, wherein the instructions are further executable by the one or more processors to generate the training data, including obtaining multiple timeseries of quick access recorded (QAR) data, each timeseries of the QAR data corresponding to one of the actual aircraft flights. The instructions are further executable by the one or more processors to generate the training data by processing parameters of the multiple timeseries to remove outlier values, add missing values, perform a smoothing operation, perform a normalization operation, or a combination thereof, to generate multiple timeseries of processed input data. The instructions are further executable by the one or more processors to generate the training data by resampling each of the multiple timeseries of processed input data to have a uniform amount of time steps.

What is claimed is:

1. A method comprising:
obtaining training data corresponding to multiple timeseries of multivariate aircraft performance data of actual aircraft flights;
processing the training data to remove outlier values and add missing values;
performing a training operation of a generative adversarial network that includes a synthetic aircraft performance data generator and a discriminator, the training operation including:
updating the synthetic aircraft performance data generator to improve a likelihood that synthetic aircraft performance data generated by the synthetic aircraft performance data generator is identified as actual aircraft performance data by the discriminator; and
updating the discriminator to improve an ability of the discriminator to distinguish between the training data and the synthetic aircraft performance data generated by the synthetic aircraft performance data generator; and
after completion of the training operation:
receiving one or more input parameters; and
generating, at the synthetic aircraft performance data generator, one or more timeseries of synthetic aircraft performance data based on the one or more input parameters.

2. The method of claim 1, wherein the one or more timeseries of synthetic aircraft performance data includes timeseries data emulating multiple flight parameters over each of one or more flights.

3. The method of claim 2, wherein the flight parameters include altitude, Mach number, total air temperature, ground speed, gross weight, fuel consumption, or a combination thereof.

4. The method of claim 1, wherein the one or more input parameters indicate how many of the timeseries of synthetic aircraft performance data are to be generated.

5. The method of claim 1, wherein the generative adversarial network corresponds to a generative adversarial network that is trained using one or more descriptors corresponding to: cruising altitude, initial weight, one or more weather conditions, an airspace, or a combination thereof.

6. The method of claim 5, wherein the one or more input parameters include: a number of flights, a particular cruising altitude, a particular initial weight, one or more particular weather conditions, a particular airspace, or a combination thereof.

7. The method of claim 1, wherein the processing of the training data to remove the outlier values and add the missing values includes:
receiving multiple timeseries of quick access recorded (QAR) data, each timeseries of the QAR data corresponding to one of the actual aircraft flights;
filtering parameters of the multiple timeseries of the QAR data based on one or more features of interest; and
processing the filtered parameters to remove the outlier values, add the missing values, or both, to generate multiple timeseries of processed input data.

8. The method of claim 7, wherein processing the filtered parameters further includes performing a smoothing operation and a normalization operation.

9. The method of claim 7, further comprising resampling each of the multiple timeseries of processed input data to have a uniform amount of time steps.

10. The method of claim 1, wherein:
the synthetic aircraft performance data generator includes:
a first layer of recurrent cells;
a second layer of recurrent cells, the second layer smaller than the first layer; and
a third layer of densely-connected cells; and
the discriminator includes:
a first convolution layer;
a second convolution layer;
a 1-dimension max-pooling layer;
a layer of recurrent cells; and
at least one layer of densely-connected cells.

11. The method of claim 1, further comprising storing the one or more timeseries of synthetic aircraft performance data for use in determining data analytics, aircraft performance analyses, or a combination thereof.

12. A system comprising:
a memory configured to store instructions which, when executed by one or more processors, cause the one or more processors to:
obtain training data corresponding to multiple timeseries of multivariate aircraft performance data of actual aircraft flights;
process the training data to remove outlier values and add missing values;
perform a training operation of a generative adversarial network that includes a synthetic aircraft performance data generator and a discriminator, the training operation including:
updating the synthetic aircraft performance data generator to improve a likelihood that synthetic aircraft performance data generated by the synthetic aircraft performance data generator is identified as actual aircraft performance data by the discriminator; and
updating the discriminator to improve an ability of the discriminator to distinguish between the training data and the synthetic aircraft performance data generated by the synthetic aircraft performance data generator; and
after completion of the training operation:
receive one or more input parameters; and
generate, at the synthetic aircraft performance data generator, one or more timeseries of synthetic aircraft performance data based on the one or more input parameters.

13. The system of claim 12, wherein the one or more processors comprise the generative adversarial network including a synthetic aircraft performance data generator and a discriminator, wherein the generative adversarial network corresponds to a generative adversarial network that is trained using one or more descriptors corresponding to: cruising altitude, initial weight, one or more weather conditions, airspace identifier, or a combination thereof, and wherein the one or more input parameters include: a number of flights, a particular cruising altitude, a particular initial weight, one or more particular weather conditions, a particular airspace identifier, or a combination thereof.

14. The system of claim 12, wherein:
the synthetic aircraft performance data generator includes:
a first layer of recurrent cells;
a second layer of recurrent cells, the second layer smaller than the first layer; and
a third layer of densely-connected cells; and the discriminator includes:
   a first convolution layer;
   a second convolution layer;
   a 1-dimension max-pooling layer;
   a layer of recurrent cells; and
   at least one layer of densely-connected cells.

15. The system of claim 12, wherein the one or more input parameters indicate how many of the timeseries of synthetic aircraft performance data are to be generated.

16. The system of claim 12, wherein the instructions, when executed by the one or more processors, cause the one or more processors to process the training data to remove the outlier values and add the missing values including:
   receiving multiple timeseries of quick access recorded (QAR) data, each timeseries of the QAR data corresponding to one of the actual aircraft flights;
   filtering parameters of the multiple timeseries of the QAR data based on one or more features of interest; and
   processing the filtered parameters to remove the outlier values, add the missing values, or both, to generate multiple timeseries of processed input data.

17. The system of claim 16, wherein the instructions, when executed by the one or more processors, cause the one or more processors to process the filtered parameters including performing a smoothing operation and a normalization operation.

18. The system of claim 16, wherein the instructions, when executed by the one or more processors, further cause the one or more processors to resample each of the multiple timeseries of processed input data to have a uniform amount of time steps.

19. A non-transitory computer-readable medium comprising instructions that, when executed by one or more processors, cause the one or more processors to:
   obtain training data corresponding to multiple timeseries of multivariate aircraft performance data of actual aircraft flights;
   process the training data to remove outlier values and add missing values;
   perform a training operation of a generative adversarial network that includes a synthetic aircraft performance data generator and a discriminator, the training operation including:
     updating the synthetic aircraft performance data generator to improve a likelihood that synthetic aircraft performance data generated by the synthetic aircraft performance data generator is identified as actual aircraft performance data by the discriminator; and
     updating the discriminator to improve an ability of the discriminator to distinguish between the training data and the synthetic aircraft performance data generated by the synthetic aircraft performance data generator; and
   after completion of the training operation:
     receive one or more input parameters; and
     generate, at the synthetic aircraft performance data generator, one or more timeseries of synthetic aircraft performance data based on the one or more input parameters.

20. The non-transitory computer-readable medium of claim 19, wherein:
the synthetic aircraft performance data generator includes:
   a first layer of recurrent cells;
   a second layer of recurrent cells, the second layer smaller than the first layer; and
   a third layer of densely-connected cells; and
the discriminator includes:
   a first convolution layer;
   a second convolution layer;
   a 1-dimension max-pooling layer;
   a layer of recurrent cells; and
   at least one layer of densely-connected cells.

\* \* \* \* \*